(12) United States Patent
Lejestrand et al.

(10) Patent No.: US 11,486,339 B2
(45) Date of Patent: Nov. 1, 2022

(54) AIR FILTER HOUSING WITH CLOSING ARRANGEMENT, AIR FILTER, AND VEHICLE

(71) Applicant: Volvo Truck Corporation, Gothenburg (SE)

(72) Inventors: Fredrik Lejestrand, Stora Höga (SE); Oliver Milanson, Öjersjö (SE); Carl Löwstedt, Onsala (SE); Leo Ekbom, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 43 days.

(21) Appl. No.: 16/973,102

(22) PCT Filed: Jun. 11, 2018

(86) PCT No.: PCT/EP2018/065386
§ 371 (c)(1),
(2) Date: Dec. 8, 2020

(87) PCT Pub. No.: WO2019/238213
PCT Pub. Date: Dec. 19, 2019

(65) Prior Publication Data
US 2021/0254584 A1 Aug. 19, 2021

(51) Int. Cl.
*F02M 35/02* (2006.01)
*B01D 46/00* (2022.01)
(Continued)

(52) U.S. Cl.
CPC ..... *F02M 35/0201* (2013.01); *B01D 46/0005* (2013.01); *B01D 46/009* (2013.01);
(Continued)

(58) Field of Classification Search
CPC ......... F02M 35/0201; F02M 35/02416; F02M 35/10242; B01D 46/0005; B01D 46/009;
(Continued)

(56) References Cited

U.S. PATENT DOCUMENTS

2005/0284118 A1  12/2005 Nishiyama et al.
2006/0192570 A1   8/2006 Dworatzek et al.
(Continued)

FOREIGN PATENT DOCUMENTS

CN   101014398 A   8/2007
CN   102218245 A  10/2011
(Continued)

OTHER PUBLICATIONS

First Office Action for Chinese Patent Application No. 201880094371.7, dated Sep. 18, 2021, 23 pages.
(Continued)

*Primary Examiner* — Hung Q Nguyen
(74) *Attorney, Agent, or Firm* — Withrow & Terranova, PLLC

(57) ABSTRACT

The invention relates to an air filter housing for use in an air cleaning arrangement for cleaning air to be provided to an air inlet of an internal combustion engine. The air filter housing comprises: a filter housing inlet for receiving air; and a filter housing outlet for providing filtered air to the air inlet of the internal combustion engine when an air filter is arranged inside the air filter housing between the filter housing inlet and the filter housing outlet. The air filter housing further comprises a closing arrangement controllable to be in each of a first state in which the filter housing outlet is closed by the closing arrangement, and a second state in which the filter housing outlet is open. The closing arrangement may comprise an iris shutter.

9 Claims, 3 Drawing Sheets

(51) Int. Cl.
*B01D 46/24* (2006.01)
*F02M 35/024* (2006.01)
*F02M 35/10* (2006.01)

(52) U.S. Cl.
CPC ... *B01D 46/2414* (2013.01); *F02M 35/02416* (2013.01); *F02M 35/10242* (2013.01); *B01D 2279/60* (2013.01)

(58) Field of Classification Search
CPC ............ B01D 46/2414; B01D 2279/60; B01D 46/0002
See application file for complete search history.

(56) References Cited

U.S. PATENT DOCUMENTS

| | | |
|---|---|---|
| 2010/0147145 A1 | 6/2010 | Meisel |
| 2011/0024337 A1* | 2/2011 | Kreibig ................ B01D 46/429 210/85 |
| 2014/0373495 A1 | 12/2014 | Madeira et al. |
| 2015/0075121 A1 | 3/2015 | Leitner et al. |
| 2016/0131093 A1 | 5/2016 | Moon |
| 2017/0203241 A1 | 7/2017 | Subedi et al. |
| 2018/0056899 A1* | 3/2018 | Franz ................... B01D 46/009 |
| 2018/0161716 A1 | 6/2018 | Li et al. |

FOREIGN PATENT DOCUMENTS

| | | | |
|---|---|---|---|
| CN | 102224336 A | 10/2011 | |
| CN | 104144732 A | 11/2014 | |
| CN | 104436911 A | 3/2015 | |
| DE | 102009050375 A1 | 5/2010 | |
| DE | 102008061756 A1 | 6/2010 | |
| DE | 102010044258 B4 * | 2/2014 | ............ B01D 46/10 |
| DE | 102014005734 A1 | 11/2014 | |
| EP | 1985351 A1 | 10/2008 | |
| JP | H0725266 U | 5/1995 | |
| JP | 2014168733 A | 9/2014 | |

OTHER PUBLICATIONS

International Search Report and Written Opinion for PCT/EP2018/065386, dated Feb. 25, 2019, 26 pages.
International Preliminary Report on Patentability for PCT/EP2018/065386, dated Aug. 12, 2020, 15 pages.

* cited by examiner

AIR FILTER HOUSING WITH CLOSING ARRANGEMENT, AIR FILTER, AND VEHICLE

This application is a 35 USC 371 national phase filing of International Application No. PCT/EP2018/065386, filed Jun. 11, 2018, the disclosure of which is incorporated herein by reference in its entirety.

TECHNICAL FIELD

The invention relates to an air filter housing and an air filter for a vehicle, and to a vehicle comprising such an air filter housing.

The invention can be applied in heavy-duty vehicles, such as trucks, buses and construction equipment. Although the invention will be described with respect to a truck, the invention is not restricted to this particular vehicle, but may also be used in other vehicles, for instance buses or various kinds of working vehicles, such as wheel loaders, excavators, or articulated haulers etc.

BACKGROUND

Since an internal combustion engine (ICE) needs clean air for combustion, an air cleaning arrangement is generally arranged in a flow path between ambient air and air inlet of the ICE.

Such an air cleaning arrangement typically includes an air filter housing having a filter housing inlet for receiving air and a filter housing outlet for providing filtered air to the air inlet of the ICE, and a replaceable air filter arranged inside the air filter housing between the filter housing inlet and the filter housing outlet.

The air filter should be replaced on a regular basis to keep air cleaning at the desired level. During an air filter replacement operation, a dirty air filter is removed and replaced with a new air filter. In conventional air cleaning arrangements, the air inlet of the ICE may be exposed, and unclean air and/or particles could enter the ICE. This can lead to damages on engine parts.

In an effort to reduce the risk in connection with air filter replacement, US 2005/0284118 discloses a safety filter arranged downstream of the filter element that is replaced. Although apparently protecting the air inlet of the ICE in connection with air filter replacement, it is expected that the safety filter would increase the pressure drop across the air cleaning arrangement, and that this pressure drop would increase over time as dust is accumulated in the safety filter. This may reduce the efficiency of the ICE.

SUMMARY

An object of the invention is to provide for an improved air cleaning arrangement, in particular enabling a smaller pressure drop across the air cleaning arrangement, while preventing dust from entering the air inlet of the ICE in connection with air filter replacement.

According to a first aspect of the present invention, this object is achieved by an air filter housing for use in an air cleaning arrangement for cleaning air to be provided to an air inlet of an internal combustion engine, the air filter housing comprising: a filter housing inlet for receiving air; and a filter housing outlet for providing filtered air to the air inlet of the internal combustion engine when an air filter is arranged inside the air filter housing, in a predefined air filter position, between the filter housing inlet and the filter housing outlet, wherein the air filter housing further comprises a closing arrangement controllable to be in each of a first state in which the filter housing outlet is closed by the closing arrangement, and a second state in which the filter housing outlet is open.

The present invention is based on the realization that extra protection to prevent particles (such as dust) from entering the ICE through the air inlet is only needed in connection with air filter replacement, and not when an air filter is properly arranged inside the air filter housing. The inventors have further realized that this can be achieved by a closing arrangement controllable to be in each of a first state in which the filter housing outlet is closed by the closing arrangement, and a second state in which the filter housing outlet is open. The closing arrangement should be arranged downstream of the air filter, and may advantageously be arranged in the filter housing outlet.

According to embodiments, the closing arrangement may comprise at least one movable closure member.

Advantageously, the closing arrangement may comprise an iris shutter, which provides for a very compact solution. Alternatively, however, other kinds of shutters, such as a so-called curtain shutter may be used.

According to various embodiments, the closing arrangement may advantageously further comprise an actuator connected to the at least one movable closure member and controllable to move the at least one movable closure member.

In embodiments, the actuator may be an electric actuator, such as an electric motor.

Alternatively, or in combination, the actuator may be arranged to be manually operable to manually move the at least one movable closure member to control the closing arrangement to the first state. For instance, the closing arrangement may comprise a lever or other mechanical interface, to allow the technician to manually close the filter housing outlet before removing the air filter. This mechanical interface may be provided in combination with another actuator for automatic operation of the closing arrangement, or the air filter housing may be provided with a mechanical interface only.

The closing arrangement may further comprise a control unit for controlling operation of the electric motor. The control unit may be configured to acquire a signal indicative of a presence of an air filter in the air filter housing, and to control the electric actuator to move the at least one movable closure member depending on this signal. In particular, the control unit may be configured to control the actuator to move the at least one movable closure member to close the filter housing outlet when the signal indicates that there is no air filter in the air filter housing, and to control the actuator to move the at least one movable closure member to open the filter housing outlet when the signal indicates that an air filter has been installed in the air filter housing. Advantageously, the above-mentioned signal may also indicate whether or not an installed air filter is a correctly configured air filter, such as an original air filter, and/or if the air filter has been correctly installed. The control unit may then be configured to only control the actuator to move the at least one movable closure member to open the filter housing outlet when the signal indicates that a correct air filter has been correctly installed in the air filter housing.

The air filter housing may further comprise a filter removal detector configured to detect initiation of filter removal; and the control unit of the closing arrangement may be connected to the filter removal detector and configured to control, when the filter removal detector detects initiation of filter removal, the actuator to move the at least one movable closure member to control the closing arrangement to the first state. The filter removal detector may, for example, be configured to detect opening of the air filter housing and/or axial movement of the air filter. For instance, the filter removal detector may comprise a circuit breaker arranged to break or close an electric circuit when opening of the air filter housing and/or axial movement of the air filter takes place. In response to a signal from the filter removal detector indicating initiated filter removal, the control unit may immediately control the closing arrangement to close the filter housing outlet, so that dust can be prevented from entering the ICE.

In embodiments, the same or similar functionality may be achieved using a mechanical actuator connected to the at least one movable closure member and controllable to move the at least one movable closure member. For instance, the actuator may be configured to mechanically interact with the air filter in connection with installation of a new air filter to move at least one movable closure member to open the filter housing outlet when the new air filter is moved to its installation position. Also in these embodiments, the mechanical actuator may be configured to only be controllable to open the air filter housing outlet by a correct air filter that is being correctly installed in the air filter housing.

To facilitate correct installation of a new air filter, the air filter housing may further comprise a guiding structure for guiding the air filter towards an intended air filter position.

According to a second aspect of the present invention, it is provided an air filter for use in an air cleaning arrangement for cleaning air to be provided to an air inlet of an internal combustion engine, the air filter comprising: filter material allowing passage through the filter material of air, and preventing passage through the filter material of particles suspended in air, wherein the air filter further comprises a control arrangement for controlling the closing arrangement included in the air filter housing according to the first aspect of the present invention to transition from its first state to its second state when the air filter is arranged inside the air filter housing.

The control arrangement of the air filter may advantageously be configured to only control the closing arrangement of the air filter housing to transition from its first state to its second state when the air filter is arranged at a predefined air filter position inside the air filter housing, in other words when the air filter is correctly arranged inside the air filter housing.

According to embodiments, the control arrangement may comprise electronic circuitry configured to identify the air filter. In addition to identifying the air filter, the electronic circuitry may include timing circuitry configured to be triggered upon installation of the air filter, to allow the air filter to provide signals indicating when it is soon time to replace the air filter. For example, the air filter may provide time stamp signals to circuitry in the vehicle. Information carried by such time stamp signals and/or other signals, such as a signal indicating timing of installation of the new air filter may be provided to an electronic service book for the vehicle.

Moreover, the air filter housing according to the above first aspect of the present invention, and the air filter according to the above second aspect of the present invention may advantageously be included in an air cleaning arrangement for cleaning air to be provided to an inlet of an internal combustion engine.

The air cleaning arrangement may be included in an internal combustion engine, further comprising an internal combustion engine having an air inlet.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
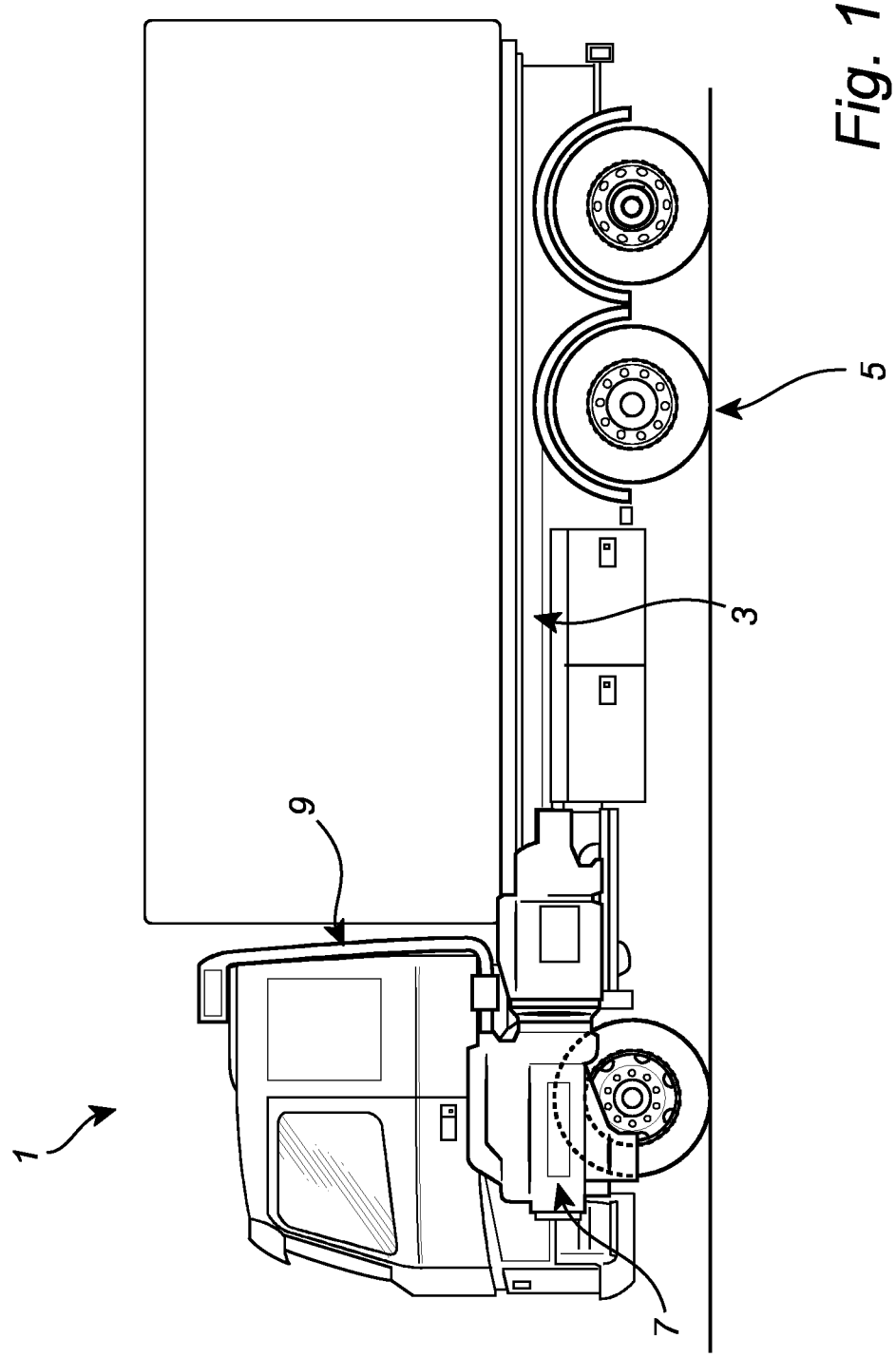
FIG. 1 is a side view of a vehicle according to an embodiment of the present invention, in the form of a truck.

FIG. 1 schematically shows a vehicle, here in the form of a truck 1, comprising a vehicle body 3 and a plurality of wheels 5, each being rotatably connected to the truck 1, and an internal combustion engine (ICE) 7 arranged to drive at least two of the wheels 5. As is schematically illustrated in FIG. 1, the truck 1 also comprises an air cleaning arrangement 9 for cleaning air needed for operation of the ICE 7.

Figure 2:
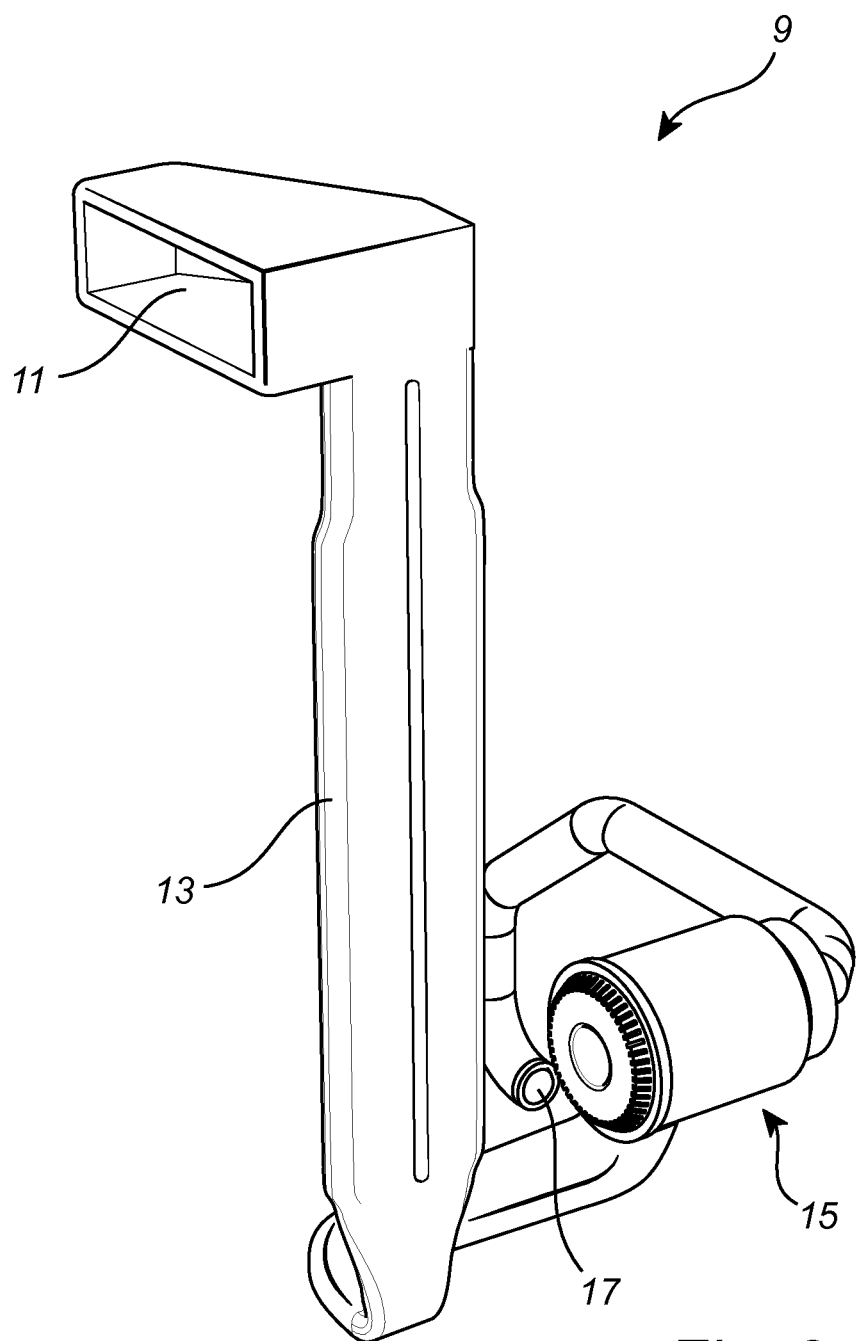
FIG. 2 schematically shows an air cleaning arrangement according to an example embodiment of the present invention.

Referring to FIG. 2, the air cleaning arrangement 9 comprises an air intake 11, an air duct 13, and an air filter housing 15, in which an air filter is arranged (not visible in FIG. 2). The air intake 11 is fluid flow connected to the air filter housing 15, which is in turn fluid flow connected to an air inlet 17 of the ICE 7. When the ICE 7 is in operation, ambient air is received at the air intake 11 and passed through the air filter in the air filter housing 15 before being provided to the air inlet 17 of the ICE 7. Hereby, dust etc. in the ambient air is prevented from reaching the air inlet 17 of the ICE 7.

Figure 3A:
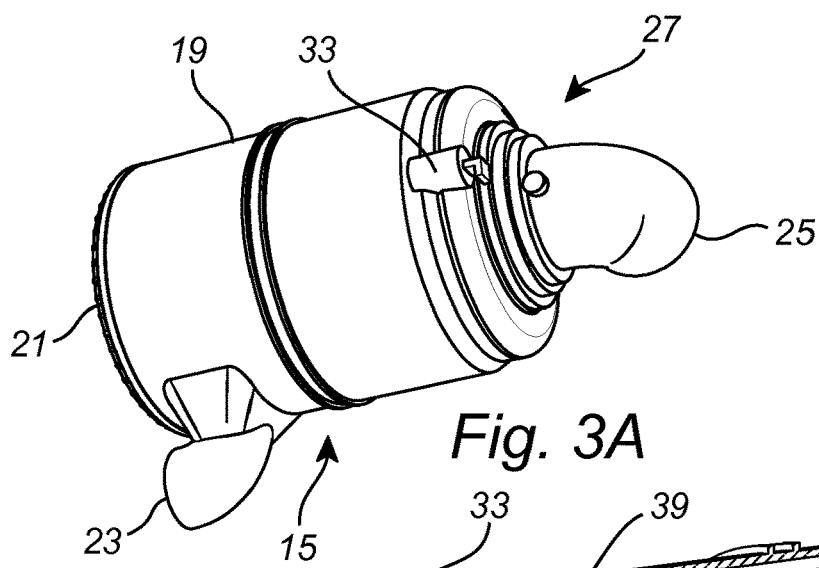
FIGS. 3A-C schematically illustrate an example embodiment of the air filter housing according to the present invention, and an example embodiment of the air filter according to the present invention.
Figure 3B:
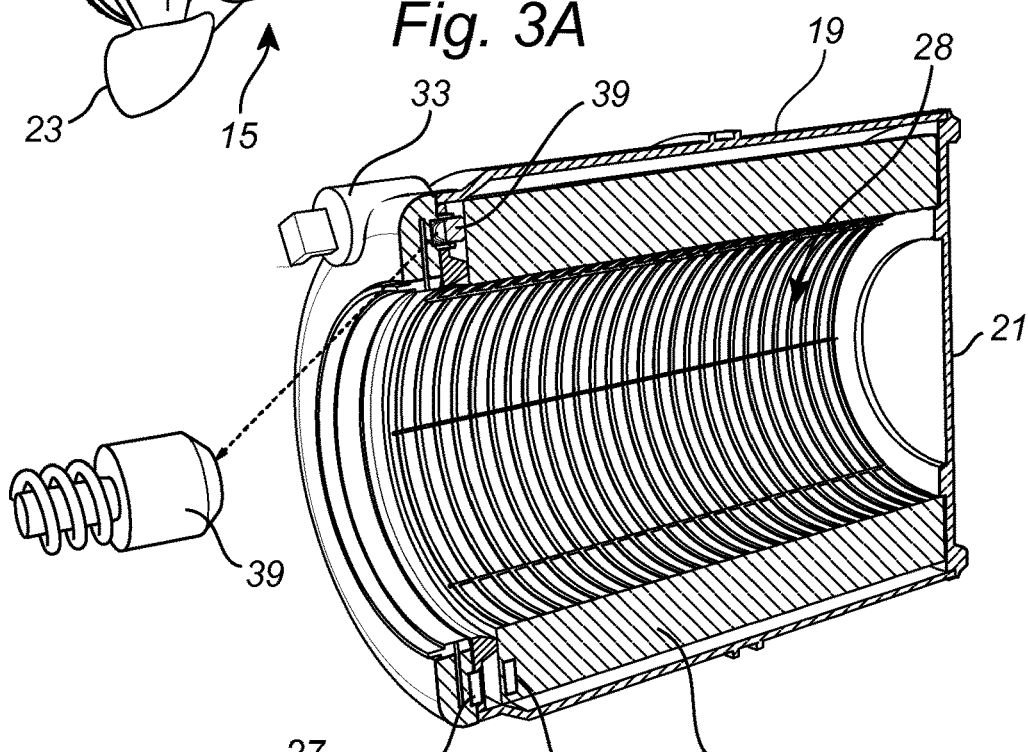
Figure 3C:
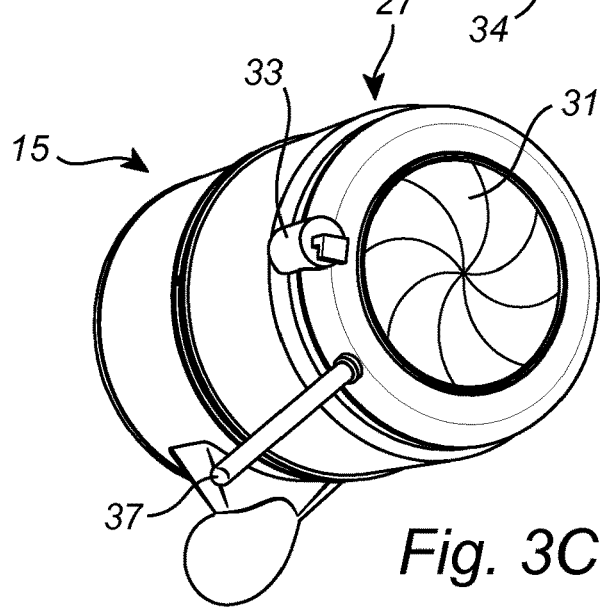

Referring now to FIGS. 3A-C, the air filter housing 15 according to an example embodiment of the present invention comprises a first filter housing part 19, and a second filter housing part 21. In the example embodiment of FIGS. 3A-D, the first filter housing part 19 is generally cylindrical, and the second filter housing part 21 is provided in the form of a lid that can be fitted onto the first filter housing part 19 to provide an air seal between the first filter housing part 19 and the second filter housing part 21. The air filter housing 15 has a filter housing inlet 23 for receiving air, and a filter housing outlet for providing filtered air to the air inlet 17 of the ICE 7 as was schematically shown in FIG. 2.

At the filter housing outlet 25, the air filter housing 15 is further provided with a closing arrangement 27 controllable to be in each of a first state in which the filter housing outlet is closed by the closing arrangement 27, and a second state in which the filter housing outlet 25 is open, so that air can be provided to the air intake 17 of the ICE 7.

In the example embodiment shown in FIGS. 3A-C, the closing arrangement 27 comprises a so-called iris shutter (sometimes also referred to as diaphragm shutter), including movable closure members, in the form of leaves 31, and an actuator. The actuator is here provided in the form of an electric motor included in a shutter control assembly 33, further comprising a control unit (not visible in FIGS. 3A-D). As is schematically shown in FIG. 3C, the closing arrangement 27 may comprise an actuator, here in the form of a lever 37 for manual operation of the closing arrangement 27. Using the lever 37, the technician carrying out an air filter exchange may manually close the closing arrangement 27 before opening the lid 21 to remove the dirty air filter. In embodiments, the closing arrangement 27 may, however, close automatically upon detecting that an air filter exchange is initiated. One exemplary way of achieving this will be described further below with reference to FIG. 3B.

Referring to FIG. 3B, the closing arrangement further comprises a filter sensing module 34 arranged to sense the presence of a correctly installed air filter 28 that is designed and approved for the particular vehicle configuration. In FIG. 3B, the generally cylindrical air filter 28 is shown as being correctly installed in the air filter housing 15. A filter identification and communication module 35 is embedded in the end portion of the air filter 28, to communicate with the filter sensing module 34 in the air filter housing 15. For instance, the filter sensing module 34 in the air filter housing 15 may be an NFC proximity reader, and the identification and communication module 35 in the air filter 28 may be an NFC tag that is powered wirelessly by the filter sensing module 34 when in close proximity of the filter sensing module 34. Alternatively, the filter sensing module 34 and the filter identification and communication module 35 may be configured for direct conductive connection through conventional connectors when the air filter 28 is correctly installed in the air filter housing 15.

As is schematically indicated in FIG. 3B, the air filter holder 15 may additionally be provided with a filter removal detector 39, which may be provided in the form of a circuit breaker, which may be arranged to by activated by contact with the insertion end of the air filter 28 (as is schematically indicated in FIG. 3B), or alternatively the circuit breaker may be arranged to be activated when the lid 21 is closed. Through the provision of the filter removal detector 39, the closing arrangement 27 may be closed immediately when the sealing force between the air filter 28 and the first filter housing part 19 is released, or when the lid 21 is opened. Hereby, it can be ensured that no dust falls into the air inlet 17 of the ICE in the early stage of air filter removal.

Before the air filter 28 was installed in the air filter housing 15 in FIG. 3B, the closing arrangement 27 was closed. When the air filter 28 in FIG. 3B was correctly inserted in the air filter housing 15, the filter sensing module 34 was able to establish a connection with the filter identification and communication module 35 in the air filter 28. Following an interrogation of the filter identification and communication module 35, where it may have been established that the air filter 28 was of the correct type and still had service life remaining (so that it was not an already used air filter), the control unit of the shutter control assembly 33 acquired a signal indicating that a correct air filter was correctly installed, and in response controlled the electric motor of the shutter control assembly 33 to control the closing arrangement 27 from its first, closed state to its second, open state.

After installation of the air filter 28, the filter sensing module 34 may intermittently or continuously check that the air filter 28 is still correctly arranged. If this is no longer the case, and the ICE 7 is running, a signal indicating displacement of the air filter 28 may be provided to the engine control unit (ECU), so that the ECU can take appropriate action, such as alerting the driver. When the ICE 7 is not running, and it is determined that the air filter 28 is no longer in its correct position (has been removed), the control unit of the shutter control assembly 33 may directly control the electric motor to close the shutter and/or provide the above-mentioned signal indicating displacement of the air filter 28 to the ECU, which may then control the shutter control assembly 33 to close the shutter.

When the shutter has been closed, as is schematically indicated in FIG. 3C, a technician replacing the air filter 28 can securely and conveniently clean the inside of the air filter housing 15 when the old air filter has been removed before installing the new air filter. This could, for example, be done by wiping with a damp cloth or blowing with compressed air.

It is to be understood that the present invention is not limited to the embodiments described above and illustrated in the drawings; rather, the skilled person will recognize that many changes and modifications may be made within the scope of the appended claims. For instance, the interaction between the air filter 28 and the closing arrangement 27 for opening the closing arrangement 27 upon installation of a new air filter 28 may be an at least partly mechanical interaction. For instance, the air filter may be designed to push down a spring loaded pin, which may be connected to an actuator for opening a shutter.

The invention claimed is:

1. An air filter housing for use in an air cleaning arrangement for cleaning air to be provided to an air inlet of an internal combustion engine, the air filter housing comprising:
 a filter housing inlet for receiving air; and
 a filter housing outlet for providing filtered air to the air inlet of the internal combustion engine when an air filter is arranged inside the air filter housing between the filter housing inlet and the filter housing outlet; and
 a closing arrangement comprising an iris shutter controllable to be in each of a first state in which the filter housing outlet is closed by the closing arrangement, and a second state in which the filter housing outlet is open, the closing arrangement comprising:
  an electric motor connected to the iris shutter and controllable to open and close the iris shutter;
  a filter sensing module configured to:
   sense a presence of a correctly installed air filter having a filter identification and communication module embedded in an end portion of the air filter to communicate with the filter sensing module in the air filter housing;
   when the air filter has been installed, attempt to establish a connection with the filter identification and communication module in the air filter; and
   interrogate, if the connection can be established, the filter identification and communication module; and
  a control unit, configured to control, if the filter sensing module can establish, based on the interrogation, that the air filter is of the correct type, the electric motor to open the iris shutter.

2. The air filter housing of claim 1, wherein:
 the air filter housing further comprises a filter removal detector configured to detect initiation of filter removal; and
 the closing arrangement is connected to the filter removal detector and configured to close the filter housing outlet, when the filter removal detector detects the initiation of filter removal.

3. The air filter housing of claim 1, wherein the air filter housing further comprises a guiding structure for guiding the air filter towards an intended air filter position.

4. The air filter housing of claim 1, wherein the filter sensing module is configured to:
   check that the air filter is still correctly arranged; and
   provide, if the air filter is not correctly arranged and the internal combustion engine is running, a signal indicating displacement of the air filter.

5. The air filter housing of claim 4, wherein the signal indicating displacement of the air filter is provided to an engine control unit.

6. The air filter housing of claim 1, wherein:
   the filter sensing module is configured to check that the air filter is still correctly arranged; and
   the control unit is configured to control the electric motor to close the iris shutter when it is determined that the air filter has been displaced and the internal combustion engine is not running.

7. An air cleaning arrangement for cleaning air to be provided to an air inlet of an internal combustion engine, comprising:
   an air filter comprising:
      filter material allowing passage through the filter material of air, and preventing passage through the filter material of particles suspended in air; and
      a filter identification and communication module embedded in an end portion of the air filter;
   an air filter housing comprising:
   a filter housing inlet for receiving air; and
   a filter housing outlet for providing filtered air to the air inlet of the internal combustion engine when the air filter is arranged inside the air filter housing between the filter housing inlet and the filter housing outlet; and
   a closing arrangement comprising an iris shutter controllable to be in each of a first state in which the filter housing outlet is closed by the closing arrangement, and a second state in which the filter housing outlet is open, the closing arrangement comprising:
      an electric motor connected to the iris shutter and controllable to open and close the iris shutter;
   a filter sensing module configured to:
      sense a presence of the air filter when it is correctly installed;
      attempt to establish a connection with the filter identification and communication module in the air filter; and
      interrogate, if the connection can be established, the filter identification and communication module; and
   a control unit, configured to control, if the filter sensing module can establish, based on the interrogation, that the air filter is of the correct type, the electric motor to open the iris shutter.

8. An internal combustion engine having an air inlet, the internal combustion engine comprising
   the air cleaning arrangement of claim 7 configured to provide filtered air to the air inlet of the internal combustion engine.

9. A vehicle comprising:
   a vehicle body;
   at least one wheel rotatably connected to the vehicle body; and
   the internal combustion engine of claim 8 configured to drive the at least one wheel.

* * * * *